Figure 1:
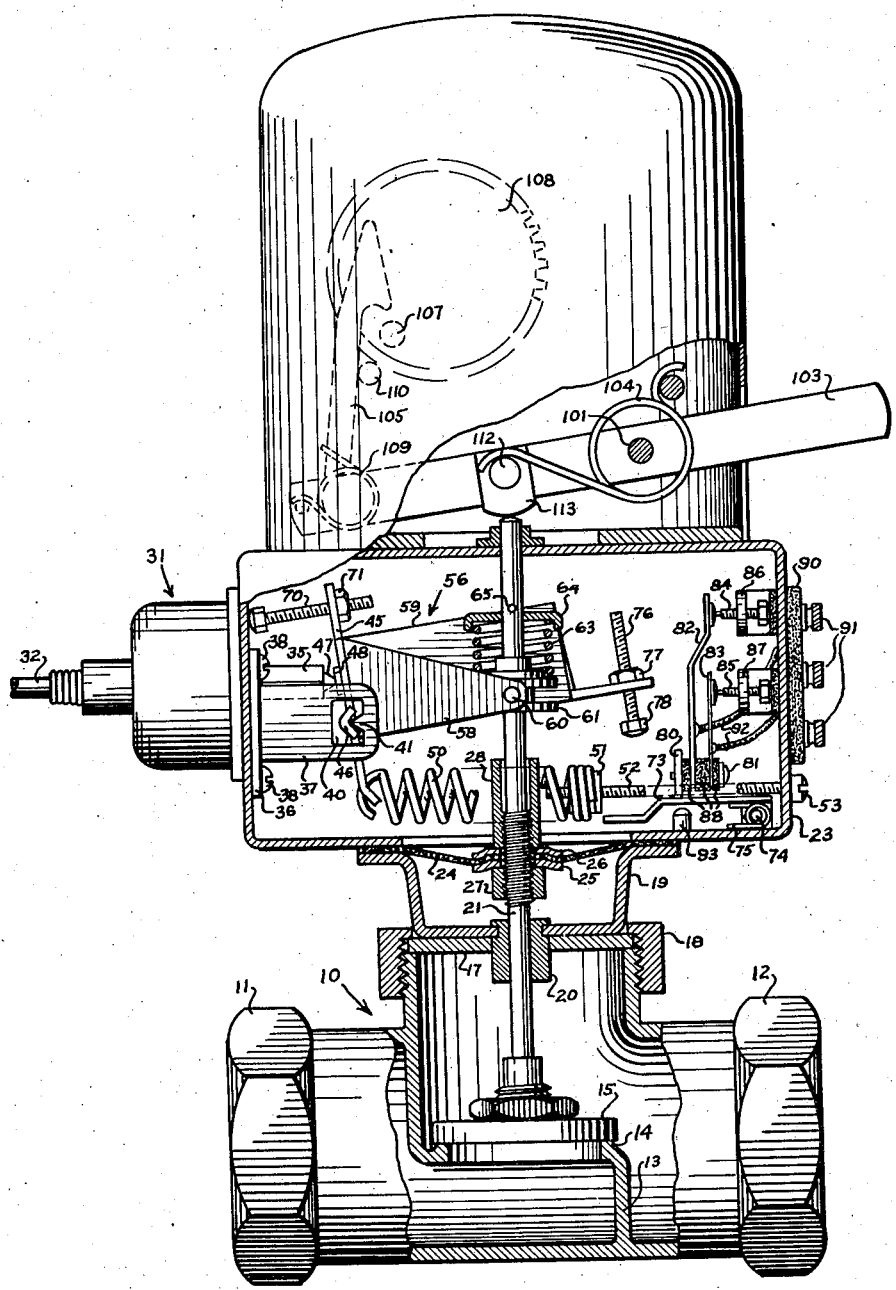

Sept. 10, 1940.  C. G. KRONMILLER  2,214,558
CONDITION CONTROLLER
Filed May 16, 1938  2 Sheets-Sheet 2

Inventor
Carl G. Kronmiller
By
George H. Fisher
Attorney

Patented Sept. 10, 1940

2,214,558

UNITED STATES PATENT OFFICE 2,214,558

CONDITION CONTROLLER

Carl G. Kronmiller, Minneapolis, Minn., assignor to Minneapolis-Honeywell Regulator Company, Minneapolis, Minn., a corporation of Delaware Application May 16, 1938, Serial No. 208,180

14 Claims. (Cl. 236—9)

This invention relates to a condition controller and more particularly to improvements in the condition controlling arrangements disclosed in the co-pending application of George H. Fisher and Charles B. Spangenberg, Serial No. 170,009, filed October 20, 1937.

In the above referred to application, there is disclosed a condition controlling arrangement employing a valve positioned by a plurality of actuating devices each responsive to a different condition. Upon one of the conditions, such as room temperature, assuming a predetermined value, a motor is actuated in such a manner that the valve is moved towards open position, this movement being limited by a throttling device which is moved in accordance with a second condition, such as boiler pressure. The arrangement disclosed in the aforesaid application was in turn an improvement over an earlier arrangement shown in the co-pending applicatio of Frederick S. Denison, Serial No. 150,575, filed June 26, 1937. While the Fisher and Spangenberg arrangement was a considerable improvement over the early Denison arrangement, it had several distinct disadvantages which rendered its use less desirable. In the first place, the moving of the valve toward closed position by the throttling device was accomplished against the spring of a strain release connection between the room temperature responsive actuator and the valve stem. The result is that as the valve was moved toward closed position the throttling device not only had to actuate the valve against the action of the adjusting spring but also against the spring of the strain release connection, provision for which could not conveniently be made in the adjusting mechanism. The device was further quite complicated in the employment of a snap action mechanism which came into effect to close the valve after a movement thereof to a predetermined minimum open position. This snap action mechanism while highly effective did result in the cost of the valve being considerably increased. The present invention is concerned with improvements in the previous arrangement, these improvements being broadly applicable to such an arrangement even though the positioned element may be some other condition controlling member than a valve.

An object of the present invention is to provide an arrangement of the type discussed above in which the strain release connection is between the throttling means and the positioned element.

A further object of the present invention is to provide such an arrangement in which the throttling device is effective upon moving the positioned element to a predetermined position to cause the motor means to move the element to its safe position.

A still further object of the invention is to provide an arrangement according to the previous object in which the throttling device actuates contacts in the motor circuit.

A further object is to provide such an arrangement in which the throttling device actuates adjustably spaced contacts arranged to provide an adjustable differential between the position at which the throttling device loses control and that at which it regains control of the positioned element.

Figure 2:
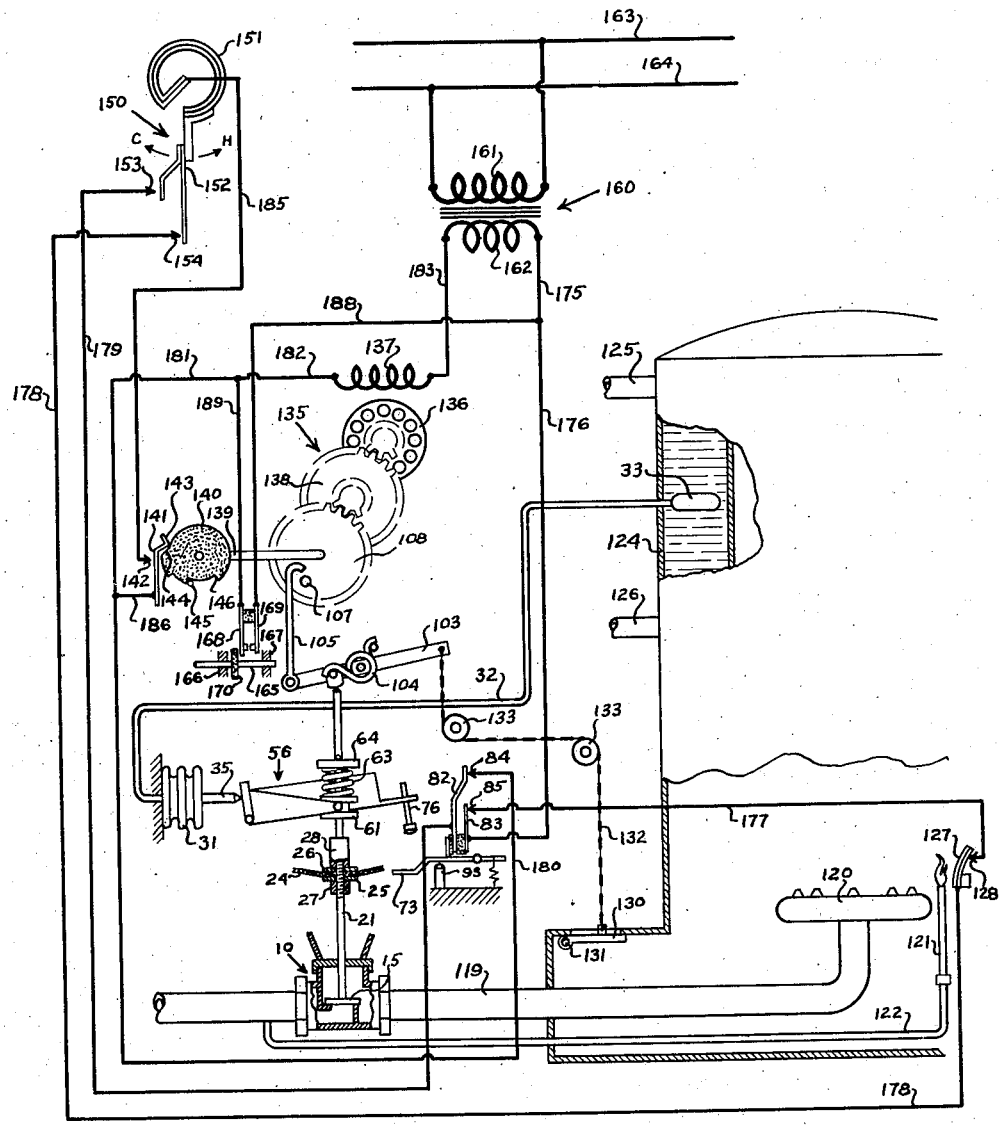

Other objects of the invention will be apparent from a consideration of the accompanying specification, claims and drawings, of which:

Figure 1 is an elevational view, partly in section, of the improved valve actuating mechanism; and Figure 2 is a schematic view of the temperature control system employing the improved controller of the present invention.

Referring to the drawings for a clearer understanding of the present invention, Figure 1 discloses, as indicated above, the improved valve operating mechanism of the present invention. Referring to this figure, the valve body is generally designated by the reference numeral 10. This valve body 10 comprises an inlet connection 11 and an outlet connection 12. Extending across the interior of the valve body is the usual transverse 13 which is apertured to provide a valve seat 14. A valve disc 15 seats on the valve seat 14. The valve body 10 is closed at its upper end by a closure plate 17 which is held in position by a screw thimble nut 18. Secured to the closure plate 17 is a cup-shaped member 19 which has secured to the bottom thereof a valve stem guide 20. This guide 20 extends through an aperture in closure plate 17 and serves to guide the movement of a valve stem 21. The cup-shaped member 19 supports a housing 23 which serves to enclose the valve operating mechanism. Interposed between the members 19 and 23 is a diaphragm 24. The inner portion of diaphragm 24 is clamped between two washers 25 and 26 by means of nuts 27 and 28 which are threadedly secured to the valve stem. The diaphragm acts as a seal-off diaphragm to prevent gas from the valve casing from passing into the housing 23.

As indicated previously, the valve disc 15 is positioned by the cooperative action of several actuating devices. One of these actuating devices serves to modulate the position of the valve whereas the other is for the purpose of closing the valve. The modulating actuating means comprises a bellows, only the housing of which is shown in Figure 1, and which is generally indicated by the reference numeral 31. As indicated in Figure 2, the bellows 31 is connected through a capillary tube 32 to a bulb 33 containing a vaporizable fluid, which bulb is placed in a liquid whose temperature controls the operation of the valve. Secured to the bellows is a plunger 35, which plunger is actuated by the fluid temperature to which bulb 33 is subjected changes, the bellows serving as a motor to position the plunger. A U shaped bracket 36, only one leg 37 of which is shown in the drawings, is secured to the housing 23 by screws 38. The leg 37 of bracket 36 is apertured at 40 and projecting inwardly from the right edge of this aperture is a knife edge fulcrum 41. It will be understood that the other leg of the U shaped bracket 36 corresponds to leg 37 so that two spaced knife edge fulcrums 41 are provided.

The fulcrums 41 serve as pivots for a lever generally indicated by the reference numeral 45. The lever 45 is provided with two arms 46 each bent so as to be V shaped in cross-section, each arm bearing against one of the knife edges 41. The plunger 35 secured to the bellows unit 31 is provided with a conical tip 47 which is adapted to project into a conically recessed bearing 48 secured to the lever 45. The plunger 35 thus serves to urge the lever 45 against knife edges 41 and rotate it in a clockwise direction. Such clockwise rotation is resisted by a coil spring 50 which has one end thereof secured to the lower end of lever 45. The other end of the spring 50 has threadedly secured therein a plug 51 provided with a threaded aperture extending therethrough. An adjusting screw 52 extends through the housing 23 and is threadedly engaged with the plug 51. The screw 52 is provided with a slotted head 53 whereby the screw can readily be turned. It will be obvious that as the screw is rotated in one direction or another, the tension of spring 50 is varied. Since the position of lever 45 is determined by the relative values of the force exerted by plunger 35 and that exerted by spring 50, it will be obvious that adjustment of screw 52 will change the position of lever 45 for any given temperature to which bulb 33 is subjected.

The lever 45 has secured thereto a U shaped arm generally indicated by the reference numeral 56. The base of arm 56 is fastened to the lever 45 by any suitable fastening means (not shown). The arm 56 comprises two legs 58 and 59, leg 58 being considerably shorter than the leg 59. Each of the legs 58 and 59 is provided with a pin 60, the two pins 60 extending into the groove of a grooved collar 61 freely slidable upon the valve stem 21. The collar 61 under normal conditions of operation is adapted to engage the upper end of the nut 28. It will be apparent that when the collar 61 is so engaged with the upper end of nut 28, the position of valve 15 is determined by the posiiton of arm 59 and consequently by the temperature to which bulb 33 is subjected. As stated above, the collar 61 is normally engaged with the nut 28. This engagement is effected by a spring 63 which bears at its lower end against the upper end of collar 61 and at its upper end against a collar 64 which in turn engages a stop 65 which may take any suitable form such as a cotter pin extending through the valve stem 21. In the position shown in the drawings, the collar 61 does not engage the nut 28 because of the valve being held closed by the other actuating means, to be described later. The arm 56 is, moreover, in its completely closed position, further counter-clockwise movement of arm 56 being prevented by the abutment screw 70, which screw is threadedly engaged with the lever 45 and has a lock nut 71 associated therewith to lock the screw 70 in any adjusted position. The head of screw 70 is adapted to engage the left-hand interior wall of casing 23 as shown in the drawings.

In the case of a fuel such as gas, it is highly desirable that the modulation of the flow terminate at a certain point of minimum flow. If the flow is gradually reduced from this point, the flame will "pop back" into the mixer creating a highly undesirable condition. In the valve of the Fisher and Spangenberg application previously referred to, after the valve reached a predetermined minimum open position, it was snapped closed by reason of a snap action linkage. As indicated above, the present invention provides for the snap closing by the deenergization of a motor, which is adapted upon deenergization to shut the valve. To accomplish this deenergization of the motor, the arm 56 is adapted to cooperate with a contact carrying arm 73, which contact carrying arm is pivotally mounted at 74 and is biased in a clockwise direction by a spring 75. The longer leg 59 of the arm 56 has a screw 76 extending therethrough. A lock nut 77 is provided for the purpose of locking the screw 76 in any adjusted position. The screw 76 is provided with a head 78 which is adapted to engage with the left-hand end of contact carrying arm 73. The contact carrying arm 73 is provided with a tongue 80 bent upwardly therefrom, and secured to tongue 80 by a screw 81 are spaced contact blades 82 and 83. Interposed between the tongue 73, between the two blades 82 and 83, and between the blade 83 and the head of the screw 81 are insulating washers generally indicated by the reference numeral 88. The contact arms 82 and 83 are adapted to engage with fixed contacts 84 and 85, respectively. Contact 84 is screw-threadedly mounted in a bracket 86 and contact 85 is similarly mounted in a bracket 87. The position of contacts 84 and 85 with respect to arms 82 and 83 may be adjusted by screwing these contact members into or out of the brackets 86 and 87. Under normal conditions of adjustment, however, the switch blade 82 is adapted to disengage contact 84 upon counter-clockwise movement of arm 73 slightly before switch blade 83 disengages contact 85. The purpose of this will be discussed in more detail later. The case 23 is provided on the outer wall thereof with a terminal plate 90 of insulating material. Suitable terminals 91 are provided on this plate, these terminals being connected to the contacts 84 and 85 and to the contact blades 82 and 83 by wires 92. A stop 93 is secured to the lower wall of case 23 and serves to limit the counter-clockwise movement of arm 73. It is intended that the contact 85 be so adjusted with respect to switch blade 83 that the arm 73 will engage the stop 93 very shortly after switch blade 83 disengages contact 85.

The other actuator for the valve disc 15, which actuator is normally controlled according to the room temperature, comprises a lever 103 which is pivoted at 101. A spring 104 is associated with lever 103 and serves to bias the same in a counterclockwise direction. Pivotally secured to the lever 103 at the left-hand end thereof is a hook 105, indicated in the drawings in dotted lines. This hook 105 is adapted to be engaged by a pin 107 secured to a gear 108. A spring 109 biases the hook 105 to the right against a fixed pin 110 so that hook 105 is held in the path of movement of pin 107. The gear 108 is driven by a motor, not shown in Figure 1. Upon energization of the motor, the gear 38 is rotated in a clockwise direction. The operation of the motor and the positioning of lever 103 will be more apparent from a description of the operation of the entire system as shown in Figure 2.

Pivotally secured to the lever 103 by a pivot pin 112 is an abutment member 113 which is adapted to abut the upper end of valve stem 21. In the position shown in the drawing, the motor is de-energized so that spring 104 has been effective to rotate the lever 103 in a counter-clockwise direction, causing abutment 113 to bear against the valve stem 21 and to move the same to closed position by compression of spring 63. It may be noted at this time that the assemblage consisting of nut 28, collar 61, spring 63, collar 64, and pin 65 acts as a strain release connection between the arm 56 and the valve stem 21. This strain release connection permits the closing of valve 15 even though arm 56 is in a position wherein the valve would normally be open. It is to be understood that when lever 103 is rotated in a clockwise direction, the spring 63 will extend the strain release connection, drawing the stem 21 upwardly until the upper end of nut 28 engages collar 61. It will be clear that the extent to which valve 15 is opened will depend upon the position of collar 61 which, in turn, depends upon the temperature of the fluid to which bulb 33 is subjected.

In Figure 2, the device of the present invention is shown embodied in a temperature control system. The various elements of the valve have been given the same reference characters as in the preceding description. The valve 15 is shown as controlling the flow of gas through a pipe 119 leading to a gas burner 120. Associated with the gas burner 120 is a pilot burner 121 which is connected through a pipe 122 to the main supply pipe 119 at a point behind the valve 15. Consequently, under all normal conditions, the pilot burner 121 is maintained ignited and serves in the conventional manner to ignite the main burner 120 upon gas being admitted thereto by the opening of valve 15.

The gas burner 120 forms the burner portion of a hot water boiler, the boiler portion of which is broken away at 124 to show the water therein. Pipes 125 and 126 lead from and to the boiler, respectively. Admission of secondary air to the burner is controlled by a secondary air damper 130. This damper is pivoted at 131 and is biased to an open position. A chain 132 or other similar device extends over pulleys 133 and is connected to the lever 103 of the valve mechanism. As previously indicated, the lever 103 is rotated in a clockwise direction in connection with opening of the valve. Such clockwise rotation of lever 103 serves to permit the secondary air damper 130 to move to open position. Associated with the pilot burner 121 within the furnace is a safety pilot switch comprising a bimetallc switch blade 127 adapted to engage with a fixed contact 128. The bimetallic element 127 is so arranged that so long as the pilot burner is ignited, the bimetallic element 127 is warped into engagement with contact 128.

As previously indicated, the gear 108 is driven by an electric motor. This motor is indicated in Figure 2 by the reference character 135. The motor 135 comprises a rotor 136 and a field winding 137. A gear train 138 serves to connect the rotor 136 with the gear 108. As previously indicated, energization of the motor 135 causes clockwise rotation of the gear 108.

Connected to the gear 108 is a shaft 139 which drives a cam 140, which, in turn, actuates a switch blade 141. Switch blade 141 is adapted to be moved into engagement with contact 142, this movement being effected by the cam follower portion 143 of the switch blade 141 engaging a raised portion 144 of the cam 140. The cam 140 is secured to shaft 139 through a slip friction connection which causes, upon initial movement of shaft 139, an initial movement of cam 140 after which the cam merely slides upon the shaft 139. The movement of the cam is limited by a pin 145 engaging the opposite ends of a recess 146 in the cam. The effect of this is that upon reverse rotation of shaft 139, cam 140 is immediately rotated in a reverse direction. The switch consisting of switch blade 141 and contact 142 operates to establish a maintaining circuit for the motor field winding 137, as will be more apparent from the subsequent description.

A thermostat 150 is provided to control the operation of the motor 135. This thermostat is preferably located in a room or other space whose temperature is to be controlled. The thermostat comprises a bimetallic element 151 to which is secured a composite contact blade 152. Contact blade 152 is adapted to engage with fixed contacts 153 and 154. The blade 152 is so spaced relative to contacts 153 and 154 that upon movement of contact arm 152 to the left, it is first moved into engagement with contact 154 and thereafter moved into engagement with contact 153. Bimetallic element 151 is so arranged that upon a temperature decrease, contact arm 152 is moved to the left and upon a temperature increase to the right, as indicated by the legends C and H.

A step-down transformer 160 is used to supply low voltage power for operation of the system. Transformer 160 comprises a line voltage primary 161 and a low voltage secondary 162. Line voltage primary 161 is connected to line wires 163 and 164 leading to a suitable source of power (not shown).

One of the advantages of the type of device to which the present invention relates is the fact that it is possible to operate it safely in the absence of electric power. The valve may, at any time, be moved to open position, providing the boiler temperature is sufficiently low, by merely grasping lever 103 and turning it in a clockwise direction. A pin 165, slidably mounted in bearings 166 and 167, is provided for the purpose of retaining the lever 103 in its valve open position when so moved. It will be readily apparent that if lever 103 has been rotated in a clockwise direction sufficiently, the pin 165 can be moved inwardly under the left-hand end of lever 103 and retained in this position. A switch consisting of switch blades 168 and 169 is provided for the purpose of insuring a return of the valve to automatic control upon power restoration. The switch blade 169 is relatively fixed whereas the switch blade 168 is yieldable. Upon movement to the right of pin 165, an insulated collar 170, carried by the pin 165 engages the blade 168 and moves it to the right. It will, accordingly, be seen that when pin 165 is moved to the right so as to retain lever 103 in valve open position, switch blades 168 and 169 are moved into electrical contact. By reason of the resiliency of switch blade 168, the pin 165, when in this position, is biased to the left. The movement of pin 165 to the left is prevented, however, by the engagement of the lever 103 therewith.

*Operation*

The various elements in Figure 2 are shown in the position which they occupy when the pilot burner is ignited, the temperature to which bulb 33 is responsive is relatively low, and the temperature to which thermostat 150 is responsive is at or above the desired value. Let it be assumed now that the temperature to which thermostat 150 is responsive decreases so as to cause first the engagement of the switch blade 152 with contact 154 and then with contact 153. Engagement of switch blade 152 with contact 154 has no effect whatsoever. As soon, however, as the blade engages contact 153, the following circuit is established to motor field winding 137: from the right-hand terminal of secondary 162 through conductors 175 and 176, contact blade 83, contact 85, conductor 177, contact 128, switch blade 127, conductor 178, contact 154, switch blade 152, contact 153, conductor 179, contact blade 82, contact 84, conductors 180, 181 and 182, field winding 137, and conductor 183 to the other terminal of secondary 162. The establishment of this circuit causes field winding 137 to be energized with the result that the motor rotates in a direction to cause clockwise rotation of gear 108. After an initial movement of gear 108, cam 140 is effective to move switch blade 141 into engagement with contact 142. When this occurs, the following maintaining circuit is established to field winding 137: from the right-hand end of secondary 162 through conductors 175 and 176, contact blade 83, contact 85, conductor 177, contact 128, switch blade 127, conductor 178, contact 154, contact blade 152, bimetal element 151, conductor 185, contact 142, switch blade 141, conductors 186, 181, and 182, field winding 137, and conductor 183 to the other terminal of secondary 162. It will be noted that the new circuit is independent of contact 153 so that it is necessary for the temperature to rise to a point at which switch blade 152 is separated from contact 154 before the motor is deenergized. The result of this is that an appreciable change in temperautre is necessary between the starting and stopping of the motor. If it were not for this differential, any slight chattering of the thermostat 150 would cause rapid energization and deenergization of the motor 135.

It is also to be noted that the initial energizing circuit for the motor field winding 137 contained both contact blades 82 and 83 whereas the maintaining circuit contained only contact blade 83. As previously indicated, contact blades 82 and 83 are sequentially spaced from their respective contacts so that upon downward movement of arm 56, contact blade 83 is the last to separate from its contact. Since the initial energizing circuit must include both contact blades 82 and 83, it is assured that the valve can move over a substantial portion of its range before the nut 28 engages the collar 61 of the throttling means. By the elimination of contact 82 from the maintaining circuit, however, it is assured that during the closing cycle the valve 15 may be moved by the throttling means to a position somewhat closer to closed position than the valve was compelled to move to during the opening cycle. By suitably adjusting the contacts 84 and 85, this differential between the minimum open and the minimum closed positions may be made to assume any desired value.

Slightly after the gear 108 has rotated sufficiently to cause the switch blade 141 to be moved into engagement with contact 142 to establish the maintaining circuit previously traced, pin 107 is moved into engagement with the hook 105 so that hook 105 is moved upwardly rotating lever 103 in a clockwise direction. The result of this is that lever 103 will be moved to a position where it does not influence the position of valve 15. In other words, lever 103 will be rotated to a position wherein the nut 28 engages or substantially engages the collar 61. The throttling means is shown in the position it assumes when the water in the boiler is cold. Under these conditions, the valve 15 is moved to its wide open position before nut 28 engages collar 61. The maximum amount of gas is, accordingly, admitted to the burner 120 so that the temperature of the water in boiler 124 will begin to rise. This rise in water temperature will increase the vaporization of the liquid within the bulb 33 and cause bellows 31 to expand. The expansion of bellows 31 will cause the arm 56 to be rotated in a clockwise direction causing the collar 61 to urge the nut 28 and consequently valve 15 downwardly. During this downward movement, the assemblage consisting of collar 61, spring 63, collar 64, and nut 28 will move as a unit, the entire assemblage functioning as though arm 56 were directly connected to the valve stem.

Under normal conditions, the valve 15 will be moved to a position relative to its seat to maintain substantially just the right amount of gas flow so that upon substantially continuous operation of the burner, the room temperature is maintained at the desired value. If, however, the temperature of the water becomes sufficiently high to cause valve 15 to be moved to a position requiring too small a flow to properly sustain combustion, the motor 135 is deenergized to cause immediate closure of the valve 15. This is accomplished by the abutment screw 76 carried by the arm 56 engaging the arm 73 and moving first contact blade 82 out of engagement with contact 84 and then contact blade 83 out of engagement with contact 85. As previously pointed out, the moving of switch blade 82 out of engagement with contact 84 has no effect after the valve has once been opened. As soon as contact blade 83 is moved out of engagement with contact 85, however, the maintaining circuit is interrupted so that the motor 135 is deenergized. The deenergization of the motor 135 permits the spring 104 to rotate lever 103 in a counter-clockwise direction whereby the valve stem 21 is forced downwardly compressing the spring 63 and closing the valve 15. The moving of the valve to closed position by reason of the deenergization of the motor will be sufficiently rapid that no "pop back" is possible.

The moving of the valve disc 15 to its closed position will terminate the operation of the burner 120 and will eventually cause a reduction in the water temperature to which bulb 33 is subjected. This will cause a counter-clockwise movement of arm 56 permitting the engagement first of contact blade 83 with its contact and then of contact blade 82 with its contact. The engagement of contact blade 83 with its contact has no effect since in the meantime the closure of the valve has resulted in the maintaining switch 141 being disengaged from its contact. Thus the motor will not be reenergized until contact blade 82 has engaged its contact. If thermostat 150 is still calling for heat when such reengagement of contact blade 82 with contact 84 is effected, the motor will be reenergized through the previously traced energizing circuit permitting the valve to move upwardly until nut 28 engages collar 61. The differential between the minimum open and minimum closed valve positions referred to above is highly necessary since it is desirable that the throttling be over as wide a range as possible. With every gas burner, it is possible to throttle down to a position much closer to closed position than it is possible to modulate from during the opening cycle. In other words, it is necessary that quite a large initial flow of gas be established to a gas burner before it can be properly ignited. After the burner has once become ignited, it is possible to then throttle down to a position much closer to closed position. It will be noted that in the apparatus of the present invention, the difference between the minimum open and minimum closed positions may be readily adjusted by the adjustment of contacts 84 and 85. Moreover, if it is desired that the same relation be maintained between the minimum open and minimum closed positions but that both of these be changed an equal amount, all that is necessary is that abutment screw 76 be adjusted. It will thus be seen that a wide range of adjustments is provided by a much simpler apparatus than is possible with mechanical snap action mechanisms.

Whenever the room temperature becomes such that the contact blade 152 separates from both contacts 153 and 154, the motor 135 will be deenergized to cause closure of the valve 15. Under normal circumstances, if the apparatus is properly adjusted the room thermostat will be in its contact closed position during the majority of the time, the throttling means acting to maintain just the proper flow of gas to the burner.

If at any time the pilot burner should be extinguished, the motor will be deenergized to cause closure of the valve. Since the safety pilot switch is in series with contact 154 which is in both the energizing and maintaining circuits, it is impossible to energize the motor or maintain the same energized when the pilot burner is extinguished.

As previously indicated, this type of device is particularly adapted for operation in the event of power failure. All that it is necessary to do under these circumstances is to grasp the right-hand end of lever 103, rotating the same in a clockwise direction to a substantial valve open position wherein pin 165 may be moved under the left-hand end of lever 103 to hold the valve in such substantial open position. With the elements in this position, the valve is no longer under control of the thermostat 150. The operation, however, is entirely safe inasmuch as the actuator comprising bellows 31 and bulb 33 is still effective. Thus, under these circumstances, as the boiler water temperature rises, the valve is moved towards closed position in the manner previously described, thus preventing an excessive boiler temperature. While the valve will not be closed upon disengagement of contact blades 82 and 83 from their respective contacts, provision is made so that the valve will not be throttled completely closed even during such power failure operation. This is accomplished by means of the stop 93. As indicated earlier, the contact 85 is so adjusted with respect to contact blade 83 that the arm 73 engages stop 93 very shortly after disengagement of contact blade 83 from contact 85 has been effected. Thus the stop 93 will prevent further movement of arm 73 and consequently of arm 56 when the valve reaches a position corresponding substantially to its minimum closed position. In this position of the valve, the flow of gas to the burner is sufficiently small that there will be no danger from overheating.

Provision is made for immediately restoring the control of the valve to the thermostat upon power restoration. As previously indicated, the moving of pin 165 to the right in connection with the manual opening of the valve causes switch blade 168 to be moved into contact making engagement with switch blade 169. The engagement of these two contacts has no effect so long as the power is off. As soon, however, as power is restored, an energizing circuit is established to field winding 137 as follows: from the right-hand end of secondary 162 through conductors 175 and 188, switch blades 169 and 168, conductors 189 and 182, field winding 137, and conductor 183 to the other terminal of secondary 162. It will be noted that this circuit is independent of all controls so that as soon as power is restored, the establishment of this circuit is assured. The pin 165 is so located that it does not hold lever 103 in a position corresponding to completely valve open position. Accordingly, as soon as field winding 137 is energized in the manner just explained, the lever 103 is moved slightly further so that lever 103 is moved out of engagement with pin 165. As soon as this occurs, the biasing of switch blade 168 is effective to retract the same to the left, at the same time moving pin 165 back to the position shown in the drawing wherein it is out of the path of movement of lever 103. This results in the motor 135 again being placed under control of the thermostat 150, the safety pilot switch, and the contact blades 82 and 83.

It will be noted that the present arrangement provides an extremely compact and simple means whereby the two motor means, one consisting of the bulb 33 and the bellows 31 and the other of the motor 135, may both act upon the same valve, the first motor means normally positioning the valve and the second acting to close the valve regardless of the position of the first motor means. It will further be noted that a quick closing of the valve from a minimum closed position and a quick opening to a minmum open position is provided with a relatively simple mechanism. It will be seen that this mechanism makes provision in a very simple manner for the maintenance of any desired differential between minimum open and minimum closed positions. It is further to be noted that the valve while primarily designed for operation under conditions where electric power is available may temporarily be operated with perfect safety in the absence of electrical power.

While a specific embodiment of the invention has been described for purposes of illustration, it is to be understood that the invention is limited only by the scope of the appended claims.

I claim as my invention:
1. In combination, condition changing means, a controlling element for said condition changing means movable between a first position in which said condition changing means is active and a second position in which it is relatively inactive, means for modulating said element, said means comprising a motor means positioned in accordance with the value of a first controlling condition and a strain release connection between said motor means and said element, a second motor means, means for causing said second motor means to assume either of two positions depending upon the value of a second controlling condition, said second motor means being effective when moved to one of said two motor positions to move said element to said first position against said strain release connection regardless of the position of said first named motor means, and means actuable by said first motor means and operative upon the controlling element being moved by said first motor means to a predetermined position to cause said second motor means to move said element to said first position.

2. In combination, condition changing means, a controlling element for said condition changing means movable between a first position in which said condition changing means is active and a second position in which it is relatively inactive, means for modulating said element, said means comprising a motor means positioned in accordance with the value of a first controlling condition and a strain release connection between said motor means and said element, a second electrically controlled motor means movable between two extreme positions, said second motor means being effective when moved to one of said two motor positions to move said element to said first position against said strain release connection regardless of the position of said first named motor means, and means including a contact element actuable by said first motor means and operative upon the controlling element being moved by said first motor means to a predetermined position to cause said second motor means to move said element to said first position.

3. In combination, a valve movable between an open and a closed position, means for modulating said valve, said means comprising a motor means positioned in accordance with the value of a first controlling condition and a strain release connection between said motor means and said valve, a second motor means, means for causing said second motor means to assume either of two positions depending upon the value of a second controlling condition, said second motor means being effective when moved to one of said two positions to close said valve against said strain release connection regardless of the position of said first named motor means, and means actuable by said first motor means and operative upon the valve being moved by said first motor means to a minimum open position to cause said second motor means to close said valve.

4. In combination, a valve movable between an open and a closed position, means for modulating said valve, said means comprising a motor means positioned in accordance with the value of a first controlling condition and a strain release connection between said motor means and said valve, a second electrically controlled motor means, means for causing said second motor means to assume either of two positions depending upon the value of a second controlling condition, said second motor means being effective when moved to one of said two positions to close said valve against said strain release connection regardless of the position of said first named motor means, and means including a contact element actuable by said first motor means and operative upon the valve being moved by said first motor means to a minimum open position to cause said second motor means to close said valve.

5. In combination, a valve movable between open and closed positions, a valve stem secured to said valve, a collar surrounding said valve stem between two spaced abutments thereon, a spring urging said collar into engagement with the abutment nearest said valve, means including a condition responsive device for variably positioning said collar and accordingly said valve, and further means including a device responsive to a second condition adapted to engage said valve stem, said last named means being operative upon said second condition attaining a predetermined value to close said valve against the action of said spring regardless of the value of the first condition.

6. In combination, a valve movable between open and closed positions, a valve stem secured to said valve, a collar surrounding said valve stem between two spaced abutments thereon, a spring urging said collar into engagement with the abutment nearest said valve, means including a condition responsive device for variably positioning said collar and accordingly said valve, yieldable means adapted to engage said valve stem and close said valve against the action of said spring, an electrically energized motor operatively connected to said yieldable means and effective wher. energized to retract said yieldable means to permit said valve to be variably positioned by said above named positioning means, and means including a device responsive to a second condition for controlling the energization of said motor.

7. In combination, a valve movable between open and closed positions, a valve stem secured to said valve, a collar surrounding said valve stem between two spaced abutments thereon, a spring urging said collar into engagement with the abutment nearest said valve, means including a condition responsive device for variably positioning said collar and accordingly said valve, yieldable means adapted to engage said valve stem and close said valve against the action of said spring, an electrically energized motor operatively connected to said yieldable means and effective when energized to retract said yieldable means to permit said valve to be variably positioned by said above named means, and means for deenergizing said motor upon said valve reaching a minimum open position.

8. In combination, a valve movable between open and closed positions, a valve stem secured to said valve, a collar surrounding said valve stem between two spaced abutments thereon, a spring urging said collar into engagement with the abutment nearest said valve, means including a condition responsive device for variably positioning said collar and accordingly said valve, yieldable means adapted to engage said valve stem and close said valve against the action of said spring, an electrically energized motor operatively connected to said yieldable means and effective when energized to retract said yieldable means to permit said valve to be variably positioned by said above named positioning means, means including a device responsive to a second condition for controlling the energization of said motor, and means for deenergizing said motor regardless of the value of said second condition when said valve is moved to a minimum open position by said positioning means.

9. In combination, valve means movable between open and closed positions, electrically controlled motor means operative to either close said valve means or to cause said valve means to open, a condition responsive switch in the control circuit for said motor means, a stop to limit opening of said valve means, means for variably positioning said stop in accordance with the value of a second condition, a switch comprising a movable switch blade in the control circuit for said motor means, and means associated with said stop positioning means operative upon said valve means reaching a predetermined position to move said movable switch blade so as to cause said motor means to close said valve means.

10. In a temperature control system for a space, a heater comprising a fluid fuel burner, valve means controlling the flow of fuel to the burner, electrically controlled motor means operative to either close said valve means or to cause said valve means to open, a space temperature responsive switch in the control circuit for said motor means, a stop to limit opening movement of said valve means, means for variably positioning said stop in accordance with a heater condition, a switch comprising a movable switch blade and an adjustable contact in the control circuit of said motor means, and means associated with said stop positioning means operative upon said valve means reaching a predetermined position at which the fuel flow cannot be reduced without intefering with proper combustion to move said switch blade in a manner such as to cause said motor means to close said valve.

11. In combination, valve means movable between open and closed positions, electrically controlled motor means operative to either close said valve means or to cause said valve means to open, a condition responsive switch in the control circuit for said motor means, a stop to limit opening of said valve means, means for variably positioning said stop in accordance with the value of a second condition, a switch comprising a movable switch blade in the control circuit for said motor means, and means associated with said stop positioning means operative to actuate said switch blade to prevent said motor means from causing said valve means to open until said stop is in a position to permit a predetermined opening of said valve means.

12. In combination, valve means movable between open and closed positions, electrically controlled motor means operative to either close said valve means or to cause said valve means to open, a stop to limit opening of said valve means, condition responsive means for variably positioning said stop, a pair of switches in the control circuit of said motor means, one switch controlling the opening movement of the motor means and the other the closing movement, and means associated with said stop positioning means operative to actuate said switches at different valve positions whereby said motor means is operative to close said valve means when the latter reaches a predetermined position and is unable to cause opening of said valve means until said stop is in a position to permit the uninterrupted movement of the valve to a different predetermined position.

13. In combination, valve means movable between open and closed positions, electrically controlled motor means operative when its control circuit is interrupted to close said valve means and when its control circuit is completely energized to cause said valve means to open, a stop to limit opening movement of said valve means, condition responsive means for variably positioning said stop, a pair of sequentially engageable switches, both of which must be closed to initially energize said control circuit and only one of which must be closed to maintain said circuit closed, and means associated with said stop positioning means operative to successively actuate said switches whereby said motor means is operative to close said valve means when the latter reaches a predetermined position and is unable to cause opening of said valve means until said stop is in a position to permit the uninterrupted movement of the valve to a different predetermined position.

14. In combination, valve means movable between open and closed positions, electrically controlled motor means operative when its control circuit is interrupted to close said valve means and when its control circuit is completely energized to cause said valve means to open, a switch responsive to a first condition in said control circuit to control the operation of said motor means, a stop to limit opening movement of said valve means, means responsive to a second condition for variably positioning said stop, a pair of sequentially engageable switches, both of which must be closed to initially energize said control circuit and only one of which must be closed to maintain said circuit closed, and means associated with said stop positioning means operative to successively actuate said switches whereby said motor means is operative to close said valve means when the latter reaches a predetermined position and is unable to cause opening of said valve means until said stop is in a position to permit the uninterrupted movement of the valve to a different predetermined position.

CARL G. KRONMILLER.